(12) United States Patent
Stracovsky

(10) Patent No.: US 6,442,666 B1
(45) Date of Patent: *Aug. 27, 2002

(54) TECHNIQUES FOR IMPROVING MEMORY ACCESS IN A VIRTUAL MEMORY SYSTEM

(75) Inventor: Henry Stracovsky, San Jose, CA (US)

(73) Assignee: Infineon Technologies AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,408

(22) Filed: Jan. 26, 2000

Related U.S. Application Data

(60) Provisional application No. 60/117,886, filed on Jan. 28, 1999.

(51) Int. Cl.[7] .............................................. G06F 12/10

(52) U.S. Cl. ...................................................... 711/206

(58) Field of Search ................................ 711/118, 202, 711/203, 206

(56) References Cited

U.S. PATENT DOCUMENTS

| | | | |
|---|---|---|---|
| 5,630,097 A | * 5/1997 | Orbits et al. | ................. 395/492 |
| 5,933,593 A | * 8/1999 | Arun et al. | ............ 395/182.04 |
| 5,996,055 A | 11/1999 | Woodman | ................... 711/203 |

OTHER PUBLICATIONS

Compaq Computer Corporation, "Alpha 21264 Microprocessor Hardware Referance Manual", Jul. 1999, pp. 2–11 & 2–12.*

* cited by examiner

Primary Examiner—Kevin L. Ellis
(74) Attorney, Agent, or Firm—Beyer Weaver & Thomas LLP

(57) ABSTRACT

According to the present invention, methods and apparatus for reducing memory access latency are disclosed. When a new entry is made to translation look aside buffer, the new TLB entry points to a corresponding TLB page of memory. Concurrently with the updating of the TLB, the TLB page is moved temporally closer to a processor by storing the TLB page in a TLB page cache. The TLB page cache is temporally closer to the processor than is a main memory.

8 Claims, 8 Drawing Sheets

TLB Data Structure

TLB Page to Arrayed Sense Amp Address Mapping

TECHNIQUES FOR IMPROVING MEMORY ACCESS IN A VIRTUAL MEMORY SYSTEM

CROSS-REFERENCE TO A RELATED APPLICATION

This application is takes priority under 35 U.S.C. §119(e) of U.S. patent application Ser. No. 60/117,886 filed Jan. 28, 1999 naming Henry Stracovsky as inventor and assigned to the assignee of the present application which is also incorporated herein by reference for all purposes.

FIELD OF THE INVENTION

The present invention pertains generally to computing systems. Specifically, the present invention relates to memory management systems and more particularly to a method and an apparatus for reducing latencies associated with accessing a page of memory by a processor using a translation look aside buffer in computer memory systems that utilize virtual memory addressing.

BACKGROUND OF THE INVENTION

A virtual memory system is one which allows addressing of very large amounts of memory, even though the main memory of the system encompasses a smaller address space. Virtual memory systems provide this capability by defining memory management units, in particular, pages or segments, have virtual memory address and corresponding physical memory addresses. A particular virtual memory address may be in main memory or in slower alternate memory, such as disk space. If a virtual address maps to a physical address of data is main memory, the information is readily accessed and utilized. If the physical address indicates that the page corresponding to the virtual address is located in the alternate memory, the page is transferred or swapped into main memory where the data can be accessed. The transfer typically necessitates that other information be swapped out of main memory back to the alternate memory to make room for the new information. This transfer is typically performed under the control of the memory management unit as either hardware or software.

To increase the speed of virtual memory accesses, cache memories are also included to store recently used data and instructions. These caches are first accessed before accessing main memory for the information requested. These caches may be virtually addressed or physically addressed. However, cache memories accessed in accordance with the physical address necessitates the process of virtual to physical access translation prior to checking the cache as well as the main memory.

The paging process, that is, the process of swapping pages, relies on a data structure that is indexed by the pages of memory. This data structure contains a physical address of the memory to be accessed according to the virtual address provided. This data structure containing the physical page addresses usually takes the form of a page table indexed by virtual page numbers, the size of the tables, the number of pages and the virtual memory space. Page tables are usually so large that they are stored in the main memory and are often paged themselves. This means that every memory access takes at least one or more times as long as one memory access is needed to obtain the physical address and a second access is needed to obtain the data.

One technique used in minimizing the cost of access time is to save the last translation performed so that the mapping process is skipped if the current address refers to the same page as the last one. In addition, to save additional time, advantage is taken of the principal of locality that is utilized for caches. If the references have locality, the address translations for references must also have locality. By keeping these address translations in a special cache, a memory access rarely requires a second access to translate the address. This special address translation cache is referred to as a translation look aside buffer, or "TLB". A TLB entry is like a cache entry wherein a tag portion hold portions of the virtual address and the data portion holds a physical page frame number, protection fields, use bits, and a modified or dirty bit. An example of a typical TLB data structure 100 is illustrated in FIG. 1.

A number of different methods and techniques are available for increasing the speed of accesses to virtual memory. In one method, a more heavily pipelined memory access is utilized, wherein the TLB access is performed one step ahead of the pipeline. Another approach is to match virtual addresses directly. Such caches are referred to as virtual caches. This eliminates the TLB translation time from a cache hit access situation. However, unfortunately, one drawback is that the process is very time consuming and needs to be performed for each virtual address regardless of address locality.

It should be noted that additional discussions regarding TLBs can be found in David A. Patterson and John L. Hennessey, *Computer Architecture, A Qualitative Approach Second Edition*, (Morgan Kaufmann Publishing), pages 439–457.

In view of the foregoing, it should be apparent that methods and apparatus for reducing memory access latency in a virtual memory environment is desirable.

SUMMARY OF THE INVENTION

According to the present invention, a method for reducing memory access latency in a virtual memory based system is disclosed.

In one aspect of the invention, an apparatus for reducing memory access latency in a virtual memory based system is disclosed. The apparatus includes a processor arranged to perform executable instructions, a main memory suitably coupled to the processor arranged to store executable instructions that are performed by the processor, a cache memory coupled to the processor and the main memory arranged to store a subset of recently used instructions, wherein the cache memory is located temporally closer to the processor than the main memory. The apparatus also includes a TLB page cache suitably arranged to store a TLB page, wherein under the direction of the processor, a new TLB page corresponding to a new TLB entry is moved temporally closer to the processor by moving from the main memory to the TLB page cache, wherein the TLB page cache is proximally closer to the processor than the main memory, and wherein a TLB page cache entry in the TLB page cache points to an associated TLB page.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
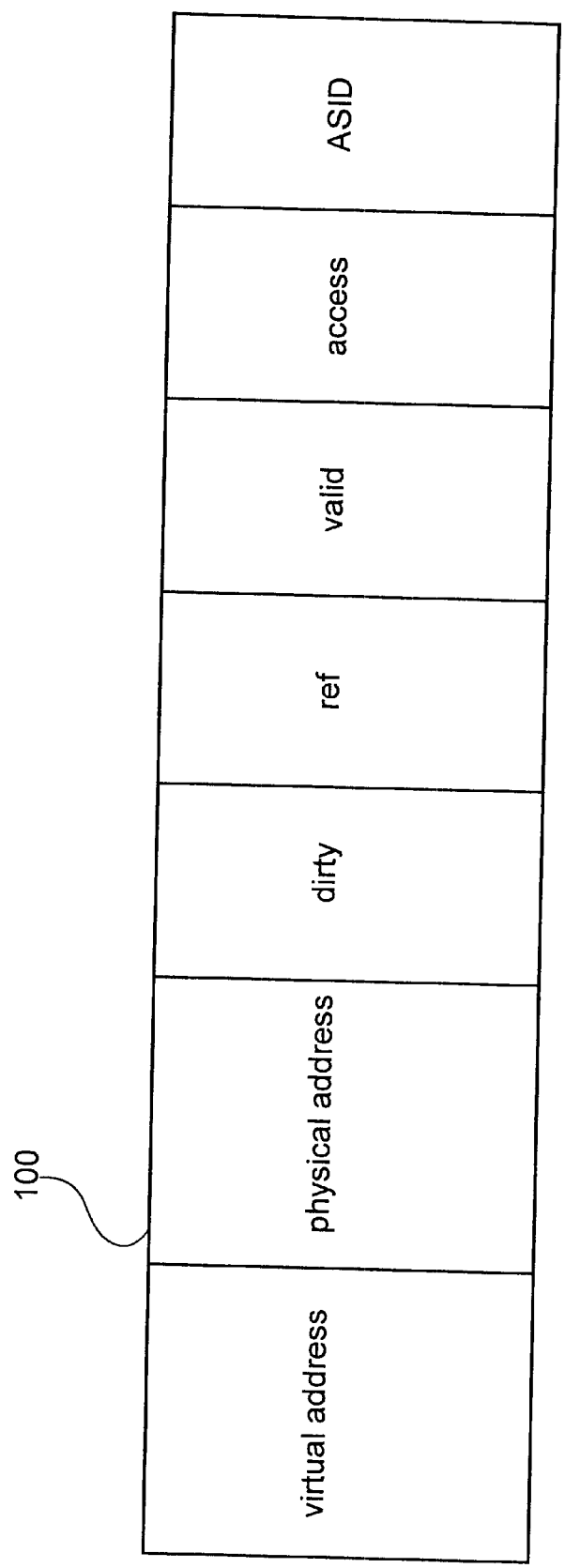
FIG. 1 illustrates a conventionally arranged TLB data structure.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In order to reduce memory latency in a computing system that uses a virtual memory addressing scheme, a translation look aside buffer, also referred to as a TLB, is used to identify the most recent set of virtual memory addresses to physical memory address translations. In the described embodiment, the computing system includes a processor (having an associated TLB) that is coupled to a main memory and a cache memory. Typically, the cache memory is used to store the most recently used memory addresses and associated data that had been previously fetched from the main memory (such as dynamic random access memory, DRAM). By storing the most recent virtual memory to physical memory translations in the TLB (that typically takes the form of a look up table, or LUT) the time required to translate a virtual memory address to a physical memory address for those translations stored in the TLB is reduced to that of a simple table lookup operation.

Since at any given instant the processor cannot access more physical memory than is described in its associated TLB, any memory page that causes a miss (i.e., is not found to be included within the processor's TLB), is moved into faster memory (such as an L1 or L2 cache, for example) that is temporally closer to the processor in parallel along with the actual updating of the TLB. It should be noted that by updating the TLB it is meant that since the TLB is a cache of frequently used pages, any page that has been determined to be not frequently used by any number and type of algorithms (such as for example, a random algorithm) is purged, or flushed, from the TLB to make room for the memory page whose virtual memory to physical memory translation was determined to not be in the TLB.

While the processor TLB is tracked, a duplicate copy is made and kept within an associated memory controller. In those cases when a particular TLB entry is replaced, the memory controller initiates the associated page (or a portion thereof) that is pointed to by the new TLB entry into a segment of the memory hierarchy that is temporally closer to the processor. By temporally closer it is meant that the memory access latency for that particular memory page or portion thereof is reduced thereby improving overall memory access time. In some implementations, the entire memory page (or block) that is pointed to by the new TLB entry is moved temporally closer to the processor, whereas in other implementations only a small portion that corresponds to the address that caused the TLB entry change itself is moved. The size of the memory page transferred to the segment of the memory hierarchy closer to the processor depends in large part upon the bandwidth of the interconnect between the various hierarchical segments.

Figure 2:
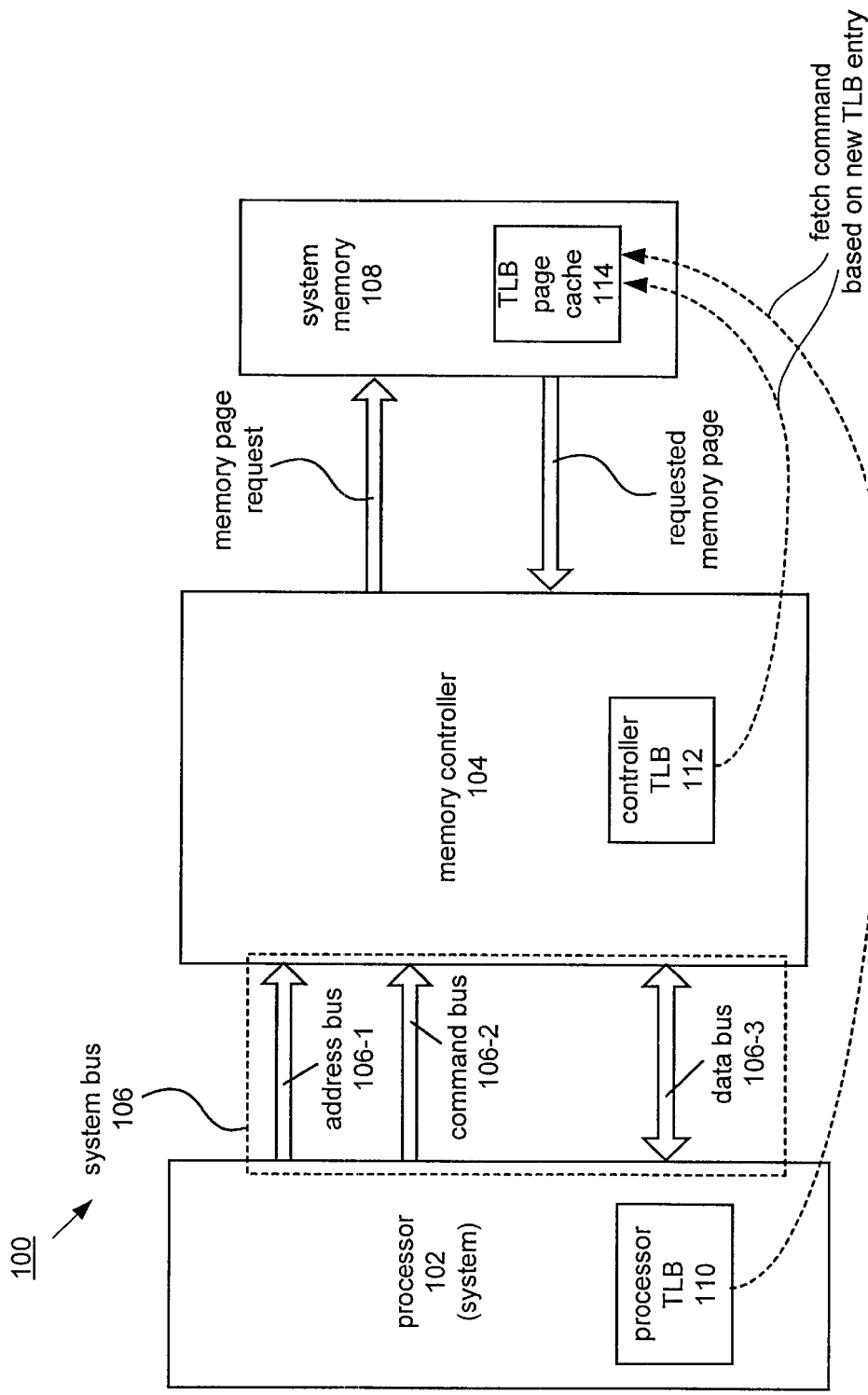
FIG. 2 illustrates a virtual memory based computer system having a distributed TLB register in accordance with an embodiment of the invention.

Broadly speaking, as shown in FIG. 2, the invention can be described in terms of a computer system 100 having a processor 102 that is coupled to a memory controller 104 by way of a system bus 106 that is suitably configured to provide access to a hierarchically organized system memory 108. In the described embodiment, the various components of the hierarchically organized system memory 108 can take many forms, such as a DRAM, an SDRAM, an SLDRAM, and EDO, an FPM, an RDRAM, etc. In the described embodiment, the system bus 106 includes a uni-directional address bus 106-1 arranged to pass memory address requests generated by the processor 102 to the memory controller 104. The system bus 106 also includes a unidirectional command bus 106-2 which, in conjunction with the address bus 106-1, carries a command associated with the memory address. For example, when the processor 102 requires an executable instruction, the processor outputs a read request (referred to as a system command) to the command bus 106-2 substantially simultaneously with a corresponding memory address request (referred to as a system address) on the address bus 106-1.

In the described embodiment, the computer system 100 is a virtual memory based computer system such that the memory address request is in fact a virtual memory address request that must be translated into a physical memory address. In this way, the proper memory address in the memory space corresponding to the system memory 108 can be accessed. In the computer system 100, the processor 102 produces virtual addresses that are translated by a combination of hardware and software to physical addresses which access physical main memory. A group of virtual address can be dynamically assigned to a particular memory page such that virtual memory requires a data structure sometimes called a page table that translates the virtual address to the physical address. To reduce address translation time, the computer system 100 use an associative cache dedicated to address translation described above as a translation look aside buffer (TLB) 110.

It should be noted, however, that the TLB 110 can in fact be located where ever the system designer has determined to be most appropriate for the particular computer system. In the described embodiment, the TLB 110 takes the form of a look up table (LUT) that is used to identify the most recent virtual memory address to physical memory address translations. By storing the most recent virtual memory to physical memory translations in the TLB 110, the time required to translate a virtual memory address to a physical memory address for those translations stored in the TLB 110 is reduced to that of a simple table lookup operation which is substantially faster than a virtual memory to physical memory translation operation.

In one implementation of the invention, whenever the processor 102 generates a particular virtual memory request, the TLB 110 is queried to determine if the requested memory page is associated with one of the memory pages pointed to by the entries in the TLB 110. As discussed above, based upon the principal of locality, the larger the size of the memory page pointed to by a particular TLB entry, the greater the likelihood of a TLB hit, i.e., the requested virtual memory page has an associated TLB entry thereby eliminating the need for a translation operation. However, in those cases where the requested memory page is not associated with a TLB entry (i.e., a miss), then the requested virtual memory page address must be translated and ultimately retrieved from the system memory.

In one embodiment of the invention, a controller TLB 112, that takes the form of a copy of the TLB register 110, is included in the controller 104 that is used to point to a memory page (typically located in a lower level of memory) that corresponds to a new entry in the TLB 110. In some implementations, the entire memory page (or block) that is pointed to by the new TLB entry is moved temporally closer to the processor to a TLB page cache 114 located temporally closer to the processor 102. It should be noted that in other implementations only a small portion that corresponds to the address that caused the TLB entry change itself is moved. The size of the memory page transferred to the segment of the memory hierarchy closer to the processor depends in large part upon the bandwidth of the interconnect between the various hierarchical components of the system memory 108. It should be noted that in this situation, the size of the data transfer is determined by the bandwidth of the interconnect between the TLB page cache 114 and the main memory. In these situation, memory architectures such as, for example, RAMBUS™ and or SLDRAM (synchronous link dynamic RAM) are more appropriate than more conventionally fast page mode type memories.

It should be noted that the actual TLB tracking mechanism can take the form of any number of implementations depending, of course, on where the location of the TLB itself. In those cases where the TLB is located within the processor itself, then the TLB is directly accessible and the processor is able to issue a notification flag to the memory controller to pre-fetch the desired data based upon the TLB miss address. In some cases, the notification flag can be made by dedicated control pins on the processor or in other cases by some variation in the processor bus protocol. In one embodiment, the flag indicates that a TLB miss has occurred and what part of the TLB has been invalidated. This may be done by a dedicated pin bus since, for example, a Pentium II™ processor has only 6 index pins and one control pin. In some cases, the processor can issue a special message cycle on the processor bus. This message cycle could carry a TLB entry index as well as the new physical address so that for the purposes of this invention, the controller TLB 112 would always be up to date with respect to the processor TLB 110.

In those cases where the control mechanism is located in the memory controller itself, then the memory controller must track the TLB content by observing the traffic to a secondary cache, for example, or a page table typically located in the main memory. In those cases where the secondary cache is monitored, then the processor must allow access to a snoop circuit within the memory controller. If, however, the secondary cache cannot be snooped and/or the processor does not indicate a TLB miss flag, the memory controller TLB must be updated when the physical address access to the missed address is issued.

Figure 3:
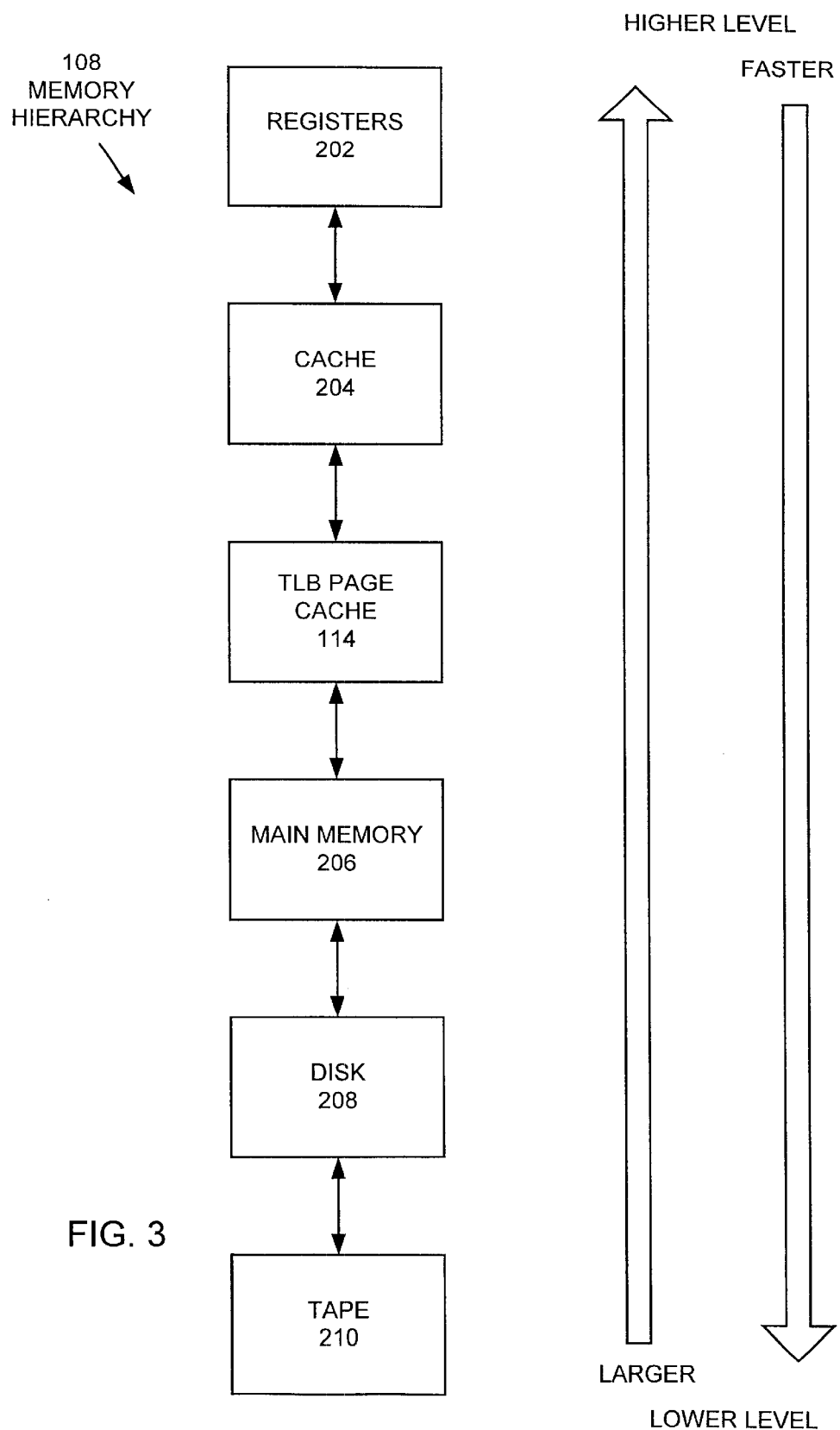
FIG. 3 illustrates a hierarchical memory arrangement in accordance with an embodiment of the invention.

FIG. 3 illustrates a particular implementation of the system memory 108 in accordance with an embodiment of the invention. As well known to those skilled in the art of computer architecture design and programming, computer systems in general, such as the computer system 100, employ a multilevel hierarchy of memory systems. In this hierarchical approach, relatively fast, expensive, limited capacity memory (i.e., registers 202) are located at the highest level of the hierarchy and proceeding to relatively slower, lower cost, higher capacity memory at the lowest level of the hierarchy. Typically, then memory hierarchy includes a small fast memory referred to as a cache memory 204 that is either physically integrated within the processor 102 (which is typically an integrated circuit) or is mounted physically close to the processor 102 in order to increase speed (i.e., temporally close) due primarily to the reduction in interconnection latency. It should be noted that there can be several different levels of caches, such as L1, L2, etc., each of which can be of different sizes and access time. Typically, the cache memory 204 is capable of storing on the order of 16–512 kilobytes of memory having a typical access time on the order of 3–30 ns is capable of storing those data sets most recently used by the processor 102, otherwise referred to as working data sets.

When data is read from, or written to, main memory 206 a copy is also saved in the cache 204, along with the associated main memory address. The cache 204 monitors addresses of subsequent reads to see if the required data is already in the cache. If it is (a cache hit) then it is returned immediately and the main memory read is aborted (or not started). If the data is not cached (a cache miss) then it is fetched from main memory and also saved in the cache.

The cache 204 is built from faster memory chips than main memory 206 so a cache hit takes much less time to complete than a normal memory access. The cache may be located on the same integrated circuit as the processor in order to further reduce the access time. In this case it is often known as primary cache there may be a larger, slower secondary cache outside the CPU chip.

It should be noted that the most important characteristic of a cache is its hit rate—the fraction of all memory accesses, which are satisfied from the cache 204. This in turn depends on the cache design but mostly on its size relative to the main memory. The size is limited by the cost of fast memory chips and more importantly, physical size limitations.

The hit rate also depends on the access pattern of the particular program being run (the sequence of addresses being read and written). Caches rely on two properties of the access patterns of most programs: temporal locality—if something is accessed once, it is likely to be accessed again soon, and spatial locality—if one memory location is accessed then nearby memory locations are also likely to be accessed. In order to exploit spatial locality, caches often operate on several words at a time, a "cache line" or "cache block". Main memory reads and writes are whole cache lines (cacheable items only)

When the processor 102 wants to write to main memory 206, the data is first written to the cache 204 on the assumption that the processor will probably read it again soon. Various different policies are used. In a write through cache, data is written to main memory at the same time as it is cached. In a write back cache it is only written to main memory when it is forced out of the cache.

If all accesses were writes then, with a write-through policy, every write to the cache would necessitate a main memory write, thus slowing the system down to main memory speed. However, statistically, most accesses are reads and most of these will be satisfied from the cache. Write-through is simpler than write-back because an entry that is to be replaced can just be overwritten in the cache as it will already have been copied to main memory whereas write-back requires the cache to initiate a main memory write of the flushed entry followed (for a processor read) by a main memory read. However, write-back is more efficient because an entry may be written many times in the cache without a main memory access. When the cache is full and it is desired to cache another line of data then a cache entry is selected to be written back to main memory or "flushed". The new line is then put in its place. Which entry is chosen to be flushed is determined by a "replacement algorithm".

In a particular implementation, the system memory 108 includes the TLB page cache 114 used to store those memory pages (or portions thereof) pointed to be a new entry in either the TLB 110 or TLB 112.

In the described embodiment, at a lowest level, a large capacity external memory storage device 210, such as a tape drive, having comparatively unlimited storage capacity yet with an average access time (i.e., latency) of anywhere from seconds to minutes. At a next lowest level, a disk memory (or any equivalent media) 208 can typically store gigabytes of data with access times on the order of approximately 10 ms whereas at a next higher level, a main memory 206 (typically in the form of a DRAM type memory device) can typically store on the order of megabytes of data having a typical access time of approximately 50 ns to approximately 150 ns. In one embodiment of the invention, a TLB page cache 114 is hierarchically located between the main memory 206 and the cache memory 204 that provides the capability of reducing the number of main memory accesses. By storing those memory pages pointed to by the translation look aside buffer 110, for example, (which in this case is located within the processor 102), the number of main memory accesses is concomitantly reduced since every time there is a TLB "hit" (i.e., a requested memory page has an associated entry in the TLB 110), the requested memory page need only be retrieved from the TLB page cache 114 and not the main memory 206 thereby reducing the overall system memory access latency over what would otherwise be achieved without the TLB page cache 114. It should be noted that in the following discussion, the page of memory corresponding to a particular TLB entry is referred to as a TLB page.

Figure 4:
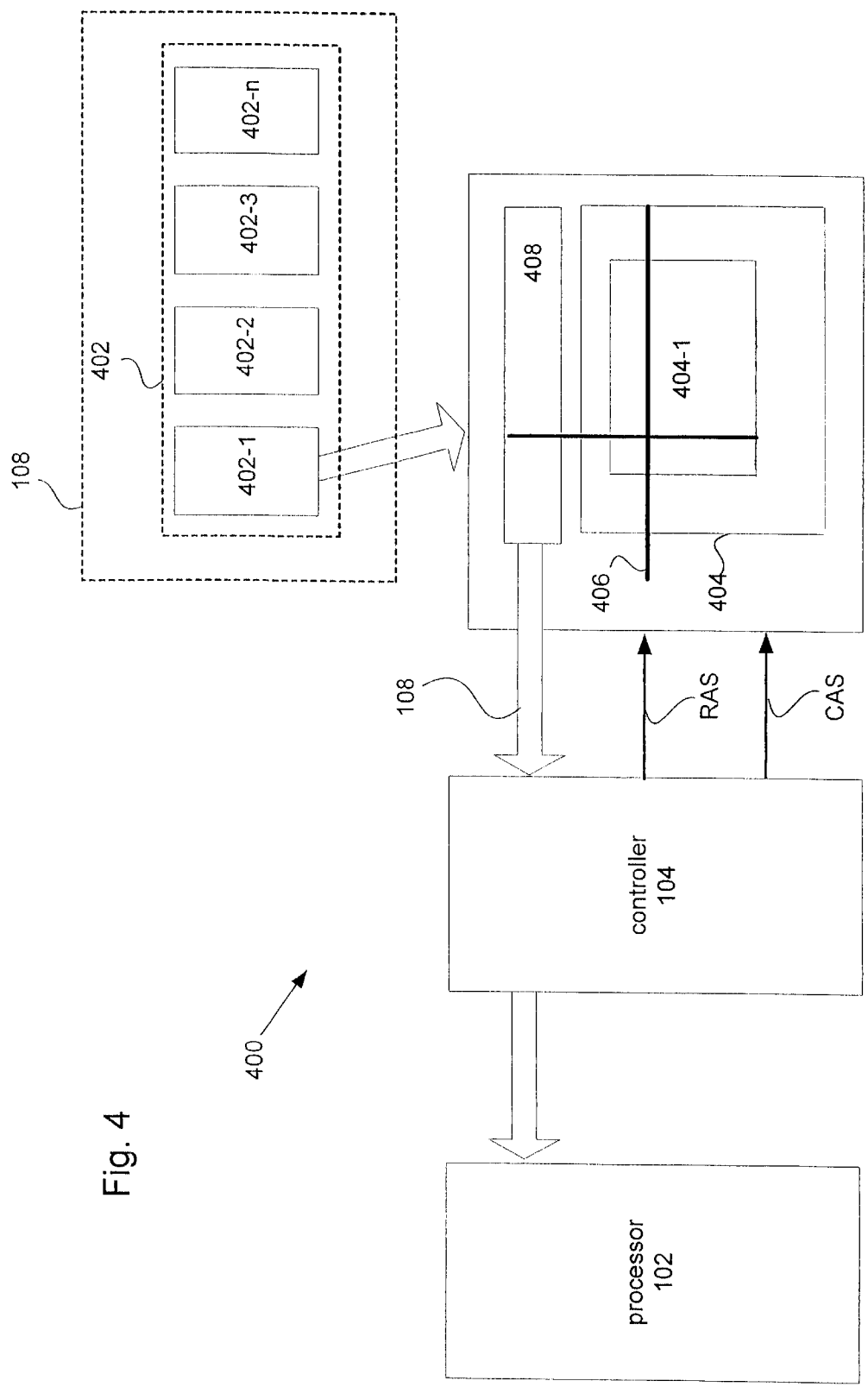
FIG. 4 illustrates a computer system whereby a TLB page is distributed amongst an array of DRAM memory devices in accordance with an embodiment of the invention.

FIG. 4 illustrates a computer system 400 having a TLB page that resides in a chip array in accordance with an embodiment of the invention. In the described embodiment the system memory 108 includes a chip array 402 formed of a plurality of DRAM type memory devices.

While in operation, if, for example, a particular memory location is to be read, the processor 102 generates an address request corresponding to the memory location in the memory array 402. Since each of the DRAMs 402-1 through 402-n that form the array 402 hold their contents in a logical "rectangle" of storage cells 404, reading data stored in, for example, a storage cell 404-1, requires that first, a row 406 be activated using what is referred to as a "Row Address Select" (or "Row Address Strobe", "/RAS") signal that is provided by the memory controller 104. Specifically, the RAS is a signal sent to a DRAM that tells it that an associated address is a row address.

Typically, the /RAS signal is based upon a most significant part of the address request provided by the processor 102. When received and properly decoded, the /RAS signal causes the data in the entire row 406 to be transferred to a sense amp 408 after a period of time required for the selected row to stabilize referred to as a recovery time. In most conventional DRAMs, the RAS to sense amp transfer is typically on the order of 30 ns.

Once the selected row has stabilized and the data in the selected row is transferred to the sense amp 408, the memory controller 104 further decodes the address request forming what is referred to as a "Column Address Select" ("/CAS") signal which when sent to a DRAM tells it that an associated address is a column address. The /CAS signal causes column select circuitry (not shown) to select the specific storage cell (in this case 404-1) of the memory array now in the sense amp that contains the desired data. The contents of the cell 404-1 are then sent out to the data bus 108 from the sense amp 408 where the processor 102 or other device that requested the data can read it. It should be noted that in most DRAMs, the CAS is typically on the order of 30 ns.

Therefore, by moving the data from the storage array 404-1 to the sense amp 408, the data is thereby moved temporally closer to the processor 102. This is quantifiably established since a RAS operation is the logical and physical predecessor of a CAS operation that moves the desired data to the bus 108.

Since the portion of the TLB page that physically resides in the memory array 402 corresponds to a column that can be brought into the sense amp 408 by the action of a row access, the TLB page is therefore moved temporally closer to the processor 102. Therefore it would be advantageous from a performance standpoint to physically and/or logically concatenate several sense amps in order to make the entire TLB page associated with the new TLB entry resident within the sense amp. By doing so, any access to that particular TLB page benefits from an overall faster access time.

Figure 5:
FIG. 5 illustrates an exemplary address mapping scheme based upon the computer system illustrated in FIG. 4.

One such arrangement is shown in FIG. 5 showing an address mapping scheme between an array of four DRAM memory chips in accordance with an embodiment of the invention.

Figure 6:
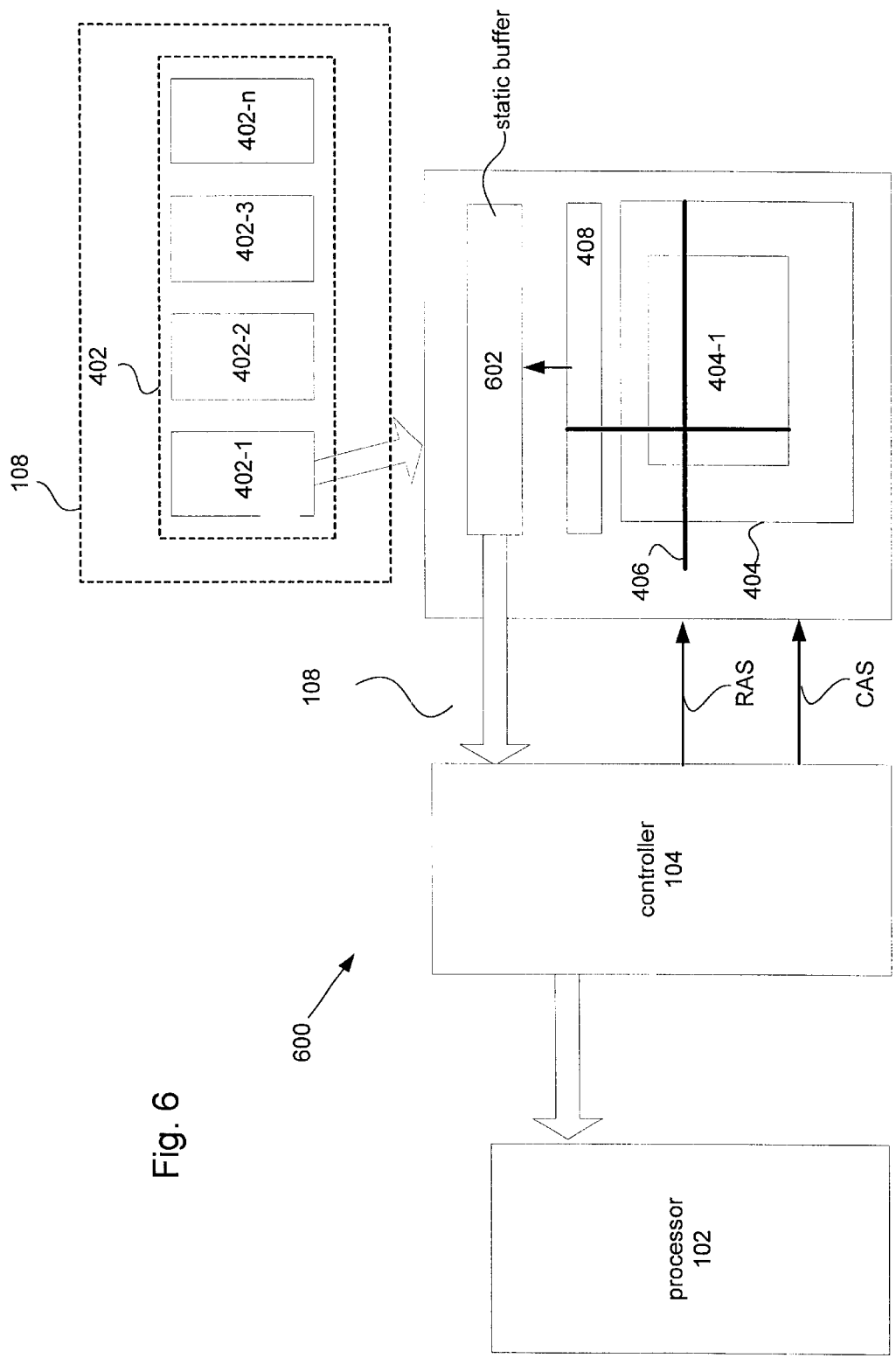
FIG. 6 illustrates a computer system wherein the array of DRAM memory devices shown in FIG. 4 include fast static buffers.

In another embodiment, shown in FIG. 6, the memory chips that form the memory array include a fast static buffer 602 in addition to a conventional DRAM memory array. Such memory chips are exemplified by the "Virtual Channel" family of DRAMs manufactured by NEC of Japan. This new architecture, realizes flexible and high-efficiency data transfer by incorporating channel buffers configured by high-speed registers. Virtual channel memory is employed in large-capacity DRAM that supports multimedia PCs, workstations, and Internet servers. The key feature of this new memory core technology is the incorporation of channel buffers configured by high-speed registers in the memory. A virtual channel DRAM performs read/write operations to and from these channel buffers from outside the memory's front-end processes. Alternatively, internal operations such as data transfer relays between memory cells and channel buffers, precharge and refresh of memory cells are performed separately from these front-end processes. As a result, background processing can be performed in parallel with foreground processing. By creating a support architecture for parallel processing, a virtual channel DRAM maintains a high average data transfer speed and exploits inherent memory performance to the highest possible extent due, in part, to the ability to access an independent channel with its own resources to access the memory array. This can result in lower overhead, low latency, high throughput and enhanced bus efficiency if appropriately deployed, such as when the various linked virtual channels are concatenated (either physically or logically) to form TLB size pages.

Figure 7:
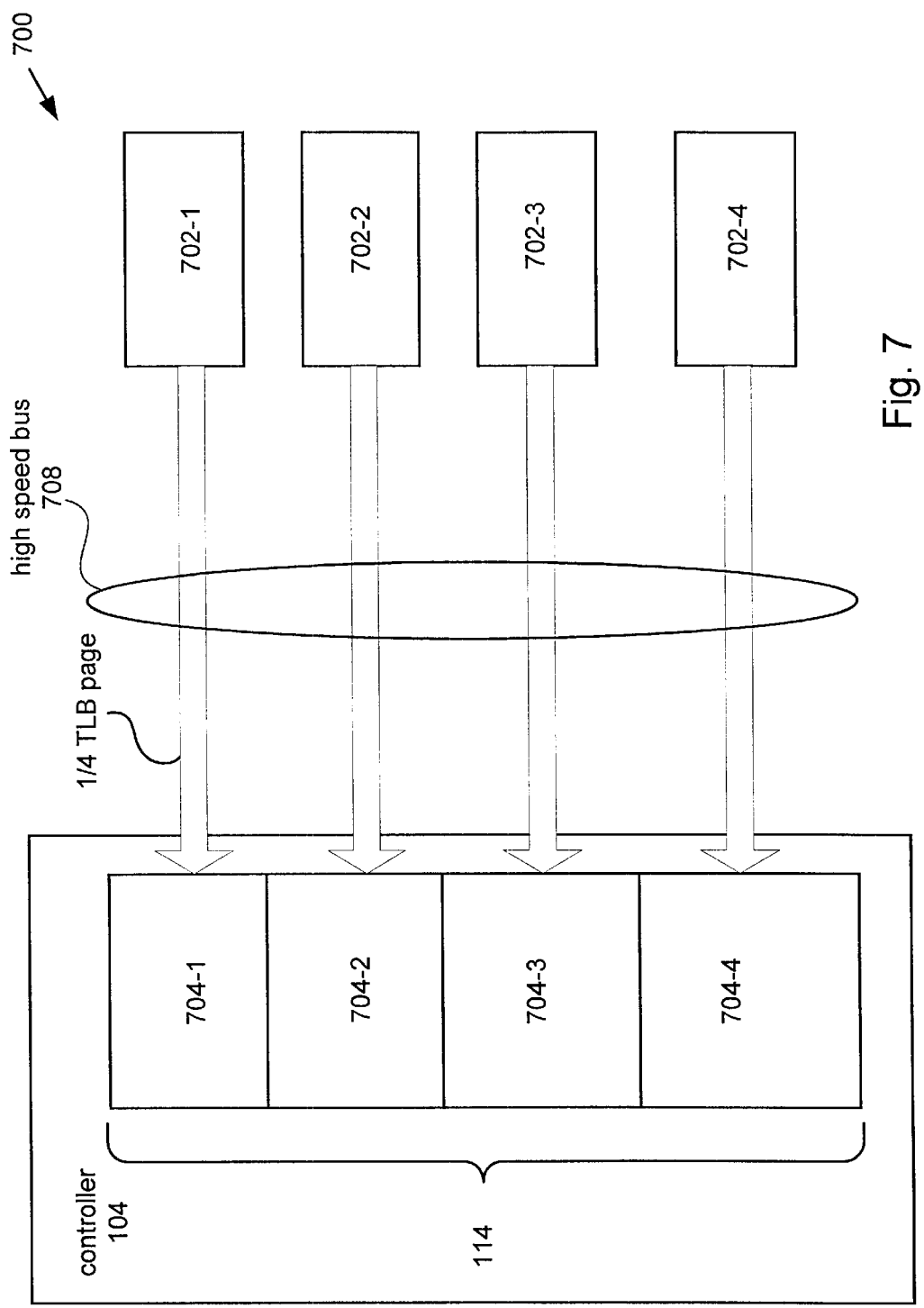
FIG. 7 illustrates a computer system having a TLB buffer in a memory controller coupled to a memory array by way of a high speed data interconnect in accordance with an embodiment of the invention.

FIG. 7 illustrates a system 700 having a high-speed interface suitable for high speed TLB page transfer in accordance with an embodiment of the invention. The system 700 can be used in a wide variety of applications, such as computer networking, data networking, instrumentation, video processing, digital processing, or any other application where the advantage of using a high speed memory device is desirable. The (RAMBUS DRAM) RDRAMs 702 can be used to perform a variety of different memory functions, such as for example, to store executable instructions that works in cooperation with processor 102. The RDRAM 702 may also be used to store data used by the processor 102 in such applications as data processing, digital image manipulation programs, and the like in which fast access to a large amount of data is highly desirable. It should be noted that the system 700 is only exemplary, and that the true scope and spirit of the invention should be indicated by the following claims.

Due to performance considerations, it is desirable to have as high a transfer rate as possible into the TLB page cache 114. Since it is well known in the art, that the inherent parallelism of DRAMs 702-1 through 702-4 supports a high transfer rate, then DRAMs 702-1 through 702-4 provide a concatenated TLB page to a TLB page cache 703 arranged as buffers 704-1 through 704-4. However, with the advent of high speed interconnects such as those represented by RAMBUS type channels, the placement of the TLB page cache 114 can be expanded to include any location capable of being coupled to the DRAMs 702 by way of the high speed bus 708.

Figure 8:
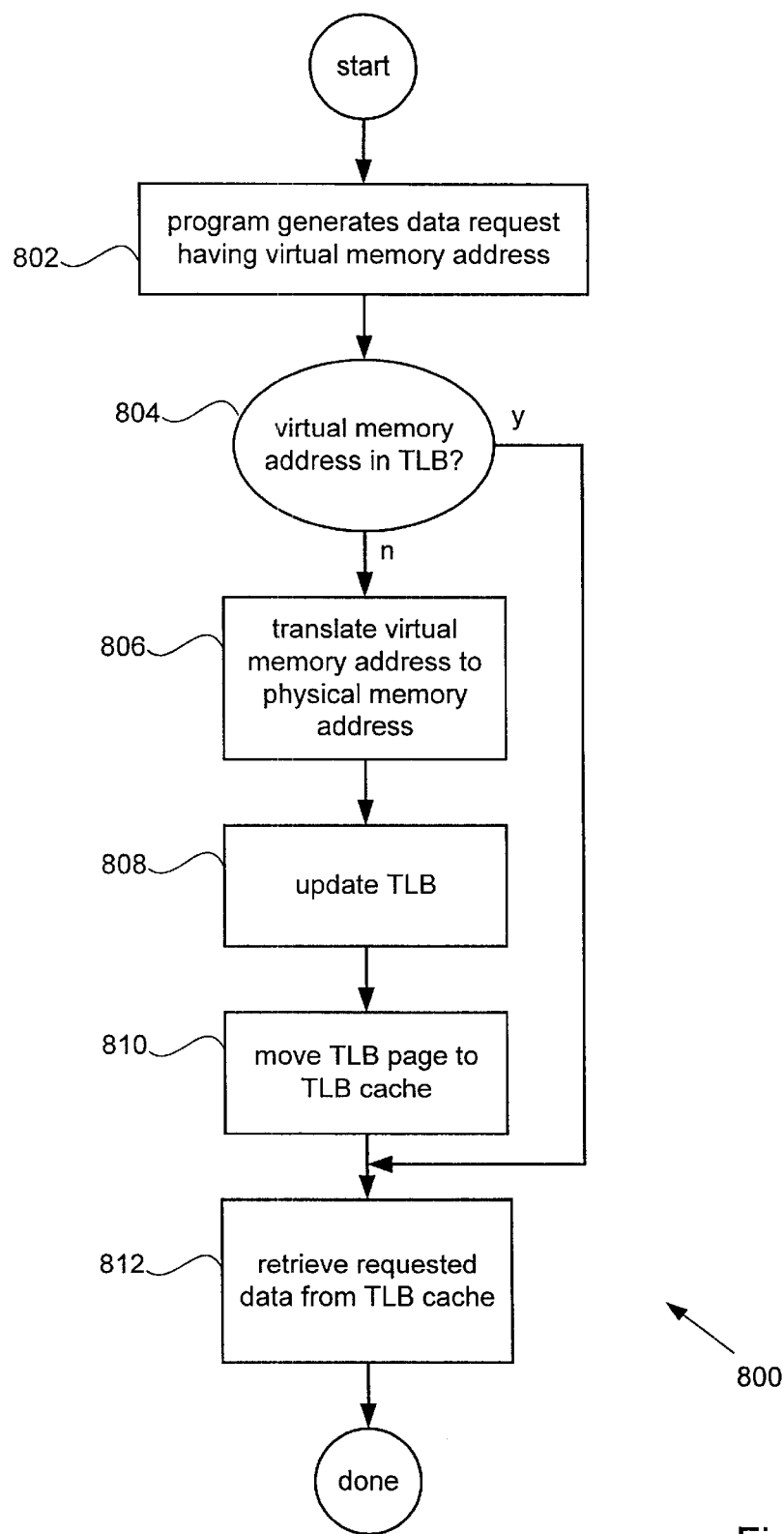
FIG. 8 is a flowchart detailing a process for reducing the memory access latency of a virtual memory based system in accordance with an embodiment of the invention.

FIG. 8 is a flowchart detailing a process 800 for moving a memory page temporally closer to a processor in accordance with an embodiment of the invention. At 802, a processor generates a data request having an associated virtual memory address. At 804, a determination is made whether or not the requested virtual memory page has an associated TLB entry in a TLB. If it is determined that the requested memory page does not have an associated TLB entry, then the virtual memory address is translated to a physical memory address using a page table at 806. Concurrently, at 808, the TLB is updated with a new TLB entry corresponding to the virtual memory to physical memory translation. At 810, a TLB page corresponding to the new TLB entry is moved temporally closer to the processor. In one embodiment, the TLB page is moved to a local TLB page cache hierarchically located between a main memory and a cache memory.

Returning to 804, if it is determined that the requested memory page does have an associated TLB entry in the TLB, then at 812, the requested memory page is retrieved from the TLB page cache. In either case, the desired data element for the retrieved page is then moved to the processor for processing.

Although the foregoing invention has been described in some detail for purposes of clarity of understanding, it will be apparent that certain changes and modifications may be practiced within the scope of the appended claims.

Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An apparatus for reducing memory access latency in a virtual memory based system, comprising:

a processor arranged to perform executable instructions;

a memory array formed of DRAM devices each of which includes a sense amp coupled to a data bus suitably coupled to the processor arranged to store executable instructions that are performed by the processor;

a cache memory coupled to the processor and the main memory arranged to store a subset of recently used instructions, wherein the cache memory is located temporally closer to the processor than the main memory;

a TLB page cache suitably arranged to store a TLB page, wherein under the direction of the processor, a new TLB page corresponding to a new TLB entry is moved temporally closer to the processor by moving from the main memory to the TLB page cache, wherein the TLB page cache is proximally closer to the processor than the main memory, and wherein a TLB page cache entry in the TLB page cache points to an associated TLB page, and wherein the TLB page is distributed amongst the sense amps associated with the memory array.

2. An apparatus as recited in claim 1, wherein the DRAM is a virtual channel type DRAM wherein the sense amp is a virtual channel.

3. An apparatus as recited in claim 1, wherein the system further includes a memory controller coupled to the processor and the memory, wherein the memory controller further includes the TLB page cache.

4. An apparatus as recited in claim 3, wherein the memory device includes a plurality of cache elements, the granularity of which corresponds in size to the TLB page.

5. A method for reducing memory access latency in a virtual memory based system, comprising:

wherein the virtual memory based system includes,
a processor arranged to perform executable instructions,
a memory array formed of DRAM devices each of which includes a sense amp coupled to a data bus suitably coupled to the processor arranged to store executable instructions that are performed by the processor,
a cache memory coupled to the processor and the main memory arranged to store a subset of recently used instructions, wherein the cache memory is located temporally closer to the processor than the main memory, and
a TLB page cache suitably arranged to store a TLB page wherein the TLB page cache is proximally closer to the processor than the main memory wherein a TLB page cache entry in the TLB page cache points to an associated TLB page, and wherein the TLB page is distributed amongst the sense amps associated with the memory array, wherein under the direction of the processor, moving a new TLB page corresponding to a new TLB entry from the main memory to the TLB page cache such that the TLB entry is temporally closer to the processor.

6. A method as recited in claim 5, wherein the DRAM is a virtual channel type DRAM wherein the sense amp is a virtual channel.

7. A method as recited in claim 5, wherein the system further includes a memory controller coupled to the processor and the memory, wherein the memory controller further includes the TLB page cache.

8. A method as recited in claim 7, wherein the memory device includes a plurality of cache elements, the granularity of which corresponds in size to the TLB page.

* * * * *